US008357064B1

(12) United States Patent
Fery (10) Patent No.: US 8,357,064 B1
(45) Date of Patent: Jan. 22, 2013

(54) DRIVE-TRAIN SPROCKET

(76) Inventor: Loyd Fery, Aumsville, OR (US)

(*) Notice: Subject to any disclaimer, the term of this patent is extended or adjusted under 35 U.S.C. 154(b) by 392 days.

(21) Appl. No.: 12/242,558

(22) Filed: Sep. 30, 2008

Related U.S. Application Data

(63) Continuation of application No. 12/228,775, filed on Aug. 15, 2008, now abandoned.

(51) Int. Cl.
*F16H 7/06* (2006.01)
(52) U.S. Cl. ....................................................... 474/156
(58) Field of Classification Search .................. 474/156, 474/234, 224, 230, 229
See application file for complete search history.

(56) References Cited

U.S. PATENT DOCUMENTS

| | | | | |
|---|---|---|---|---|
| 507,362 | A * | 10/1893 | Hart | 474/234 |
| 570,637 | A * | 11/1896 | Holt | 474/234 |
| 3,054,301 | A * | 9/1962 | Kummerer et al. | 474/234 |
| 3,119,276 | A * | 1/1964 | Pearson | 198/851 |
| 3,192,785 | A * | 7/1965 | Pearson | 474/228 |
| 3,808,813 | A * | 5/1974 | Spinks | 60/486 |
| 3,855,871 | A * | 12/1974 | Gibson et al. | 74/661 |
| 4,036,071 | A | 7/1977 | McKnight et al. | |
| 4,148,366 | A * | 4/1979 | Beckstrom et al. | 173/28 |
| 4,807,742 | A * | 2/1989 | Templin | 198/730 |
| 5,121,831 | A * | 6/1992 | Fesler | 198/853 |
| 5,918,730 | A * | 7/1999 | Wilcher | 198/851 |
| 6,958,026 | B2 | 10/2005 | Wang et al. | |

OTHER PUBLICATIONS

Online ASME advertisement for standard *B29.300—1998 Agricultural, Detachable, and Pintle Chains, Attachments, and Sprockets*, obtained from http://web.archive.org, which suggests this online publication was archived on Oct. 31, 2007.
R. Juvinall et al., "Fundamentals of Machine Component Design," Second Edition, pp. 717-722. Copyright 1991.

* cited by examiner

*Primary Examiner* — Michael Mansen
*Assistant Examiner* — Robert T Reese
(74) *Attorney, Agent, or Firm* — Klarquist Sparkman, LLP (57) ABSTRACT

Drive-train sprockets engage chains having a plurality of links joined by a corresponding plurality of pinned connections spaced longitudinally of each other along the chain. In a specific example, the links have a clevis-like portion and an arcuate segment defining a drive-surface with a characteristic outer diameter, and the arcuate segment of the first link pivotally engages the clevis-like portion of the second link to form the pinned connection. The arcuate segment extends circumferentially about only a portion of the pivot axis by an angle. The drive-train sprockets have a body having a root diameter corresponding to at least a characteristic outer diameter of the arcuate segment and the angle by which each arcuate segment extends circumferentially about the corresponding pivot axis.

21 Claims, 11 Drawing Sheets

DRIVE-TRAIN SPROCKET

CROSS REFERENCE TO RELATED APPLICATION

The present application is a continuation application claiming priority to and benefit of U.S. patent application Ser. No. 12/228,775, filed Aug. 15, 2008, now abandoned which is incorporated herein by this reference.

FIELD

The following disclosure relates to drive-trains and drive-train sprockets, such as drive-train sprockets for engaging links of an open-barrel chain, such as a pintle chain used in connection with agricultural vehicles and trailers.

BACKGROUND

Some cargo trailers, such as some agricultural trailers, have conveyors for conveying cargo. These conveyors are often driven by a chain placed in tension by a rotating sprocket. Pintle chains are often desirable in agricultural applications because the open barrels of each pinned connection of the pintle chain provides for improved and/or simplified cleaning. Open barrel chains, such as pintle chains, in drive-train applications are known to have been driven by conventional sprockets. These conventional sprockets have had more than twelve teeth, and have been driven in rotation by hydraulic drives, at least in some instances. The torque required to drive a sprocket in rotation is approximately equal to the product of a diameter of the sprocket with a tension in the chain.

The ability to convey heavy loads has been and continues to be desirable. To accommodate increased loads while using conventional hydraulic drives and existing pintle chains, some have attempted to reduce the necessary drive-torque corresponding to the increased loads by reducing the sprocket diameter and the number of teeth to seven teeth. However, this approach has resulted in a significant reduction in chain life and chain reliability.

SUMMARY

Disclosed herein are apparatus and methods for driving chains having arcuate segments, such as for example open-barrel or pintle chains, with sprockets in one embodiment that have six to twelve teeth.

According to a first aspect of an embodiment, drive-train sprockets for engaging chains having a plurality of links joined by a corresponding plurality of pinned connections spaced longitudinally of each other are disclosed. Each of the pinned connections has a respective pivot axis and joins at least a first link and a second link. Each of the at least first link and second link can be substantially identical to each other and can have a clevis-like portion and an arcuate segment defining a drive-surface with a characteristic outer diameter. In this embodiment, the arcuate segment of the first link pivotally engages the clevis-like portion of the second link to form the pinned connection. The arcuate segment of the first link extends circumferentially about only a portion of the pivot axis by an angle. In particular embodiments, the angle is about 180 degrees, such as between 165 degrees and 205 degrees. In some embodiments, the angle is between about 100 degrees and about 170 degrees. The drive-train sprocket according to the first aspect comprises a body having a teeth supporting portion of circular cross-section having a root diameter and a periphery having a corresponding circumference. A plurality of teeth are circumferentially spaced and extend outwardly from the body. Each tooth defines a tooth drive-surface contoured to substantially rollingly-engage a drive-surface of the chain. The root diameter corresponds to at least the number of the plurality of teeth, the characteristic outer diameter of the drive-surface and the angle by which each arcuate segment extends circumferentially about the corresponding pivot axis.

A distance between adjacent pinned connections can vary slightly as a result of manufacturing variation, use and/or design. In most instances, a characteristic distance between adjacent pinned connections can be defined, such as by, for example, taking a numerical average of the individual distances between several selected adjacent pinned connections.

In some embodiments according to the first aspect, the root diameter further corresponds to at least the characteristic distance between adjacent pinned connections of the longitudinally spaced plurality of pinned connections.

For embodiments disclosed herein, the plurality of teeth can number from six to twelve. In some embodiments, the plurality of teeth numbers seven. The average longitudinal spacing of the first pivot axis from the second pivot axis, in one specific embodiment, can be about 2.609 inches. In this embodiment, the characteristic distance is 2.609 inches.

The root diameter in one specific embodiment having seven teeth can be greater than five inches. The root diameter can be sized such that, for a chain section having a plurality of links numbering the same as the number of teeth of the plurality of teeth of the drive-sprocket, a first end of the chain section having a clevis-like portion with a first axis and a second end of the chain section having an arcuate segment with a second axis, the chain section can be wrapped around the sprocket to place the first axis and the second axis in substantial alignment with each other.

According to a second aspect of an embodiment, drive-train sprockets for engaging pintle chains having a plurality of longitudinally-spaced pinned connections are disclosed. Each pinned connection according to the second aspect defines a pivot axis and comprises at least one open-barrel roller having a characteristic outer-diameter extending around only a portion of the pivot axis by an angle. Sprockets according to the second aspect comprise a substantially circular body having a characteristic root diameter and a corresponding circumference and a first plurality of teeth numbering from six to twelve, with seven teeth being a desirable example. The teeth are circumferentially-spaced symmetrically about the body and each tooth defines a chain-engaging portion for engaging a corresponding portion of the pintle chain. The root diameter corresponds, at least in part, to the characteristic outer-diameter of the open-barrel rollers, the angle by which the characteristic outer-diameter extends around the pivot axis, and the longitudinal spacing of the pinned connections.

The circular body and each of the teeth can be together configured such that the chain-engaging portions defined by each of a second plurality of teeth are capable of simultaneously engaging the pintle chain, where the second plurality is a subset of the first plurality. In one specific embodiment, there are seven teeth and three teeth engage the chain.

According to a third aspect of an embodiment, drive-trains comprising a pintle chain having a plurality of longitudinally-spaced pinned connections each comprising a pin and at least one open-barrel roller extending about only a portion of the pin by an angle are disclosed. Drive-trains according to the third aspect comprise a sprocket having six to twelve teeth, with seven teeth being desirable in one embodiment, for driving the pintle chain, with at least two of the teeth simultaneously engaging two or more respective open-barrel rollers of the pintle chain.

The at least two teeth can comprise at least three teeth. The at least two teeth can comprise four or more teeth.

The pintle chain can smoothly engage and disengage the sprocket without substantial secondary motion between the sprocket and pintle chain as the sprocket rotates to drive the pintle chain. The chain in one embodiment can have a chain pitch of about 2.609 inches, and the sprocket in this embodiment can comprise a drive-sprocket having seven teeth and a root diameter of greater than five inches, such as between about 5.00 inches to about 5.20 inches. The open-barrel rollers in this embodiment can comprise an outer diameter of at least about one inch, such as between about 0.75 inches and about 1.125 inches.

Drive-trains according to the third aspect can also comprise a hydraulic drive for applying a torque to rotate the sprocket at a substantially constant speed and thereby drive the pintle chain at a substantially constant speed. The torque can remain free of substantial surges throughout a full sprocket rotation.

The foregoing and additional features of embodiments of the invention will become more apparent from the following detailed description, which proceeds with reference to the accompanying figures.

DETAILED DESCRIPTION

The following describes embodiments of sprockets for engaging, or being engaged by, a chain having arcuate segments at one or more pinned connections, such as an open-barrel pintle chain for use in agricultural applications, drive-trains with such sprockets and chains and methods related thereto.

The following makes reference to the accompanying drawings which form a part hereof, wherein like numerals designate like parts throughout. The drawings illustrate specific embodiments, but other embodiments may be formed and structural changes may be made without departing from the intended scope of this disclosure. Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same object.

Accordingly, the following detailed description shall not be construed in a limiting sense and the scope of property rights sought shall be defined by the appended claims and their equivalents.

Figure 1:
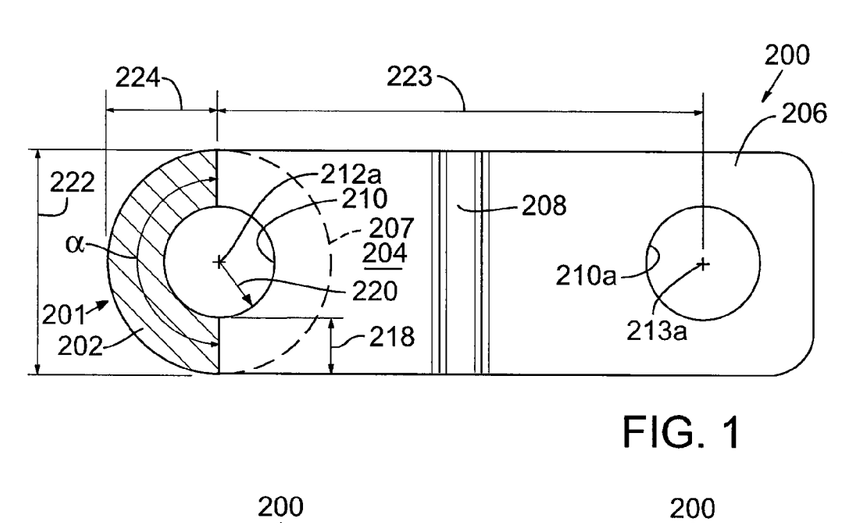
FIG. 1 illustrates a sectional side-view of an exemplary chain link.
Figure 3A:
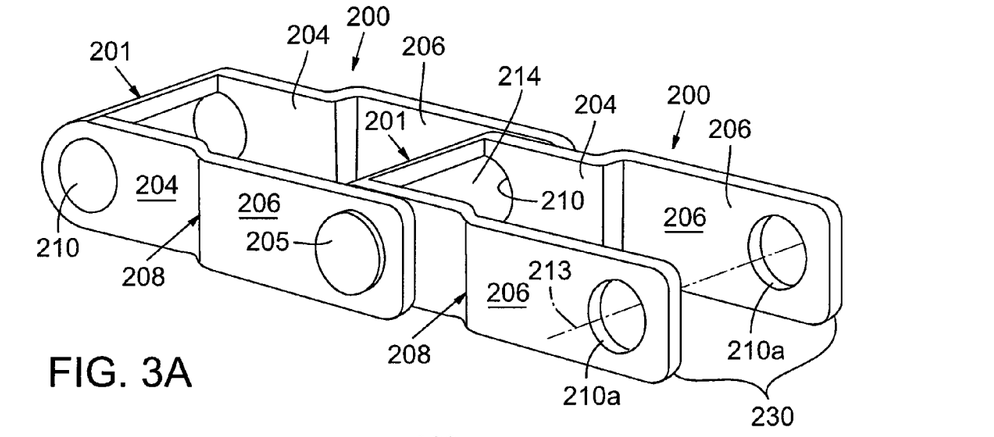
FIG. 3A illustrates an isometric view of a pair of links of the type shown FIG. 1 joined by a pinned connection.

FIG. 1 illustrates a sectioned side-view of an exemplary chain link 200 having an arcuate segment 202 defining a drive-surface 201 having an open-barrel configuration and extending between a pair of first spaced apart sidewall portions 204 (only one such portion 204 is shown in FIG. 1). The first sidewall portions 204 each define a substantially circular opening 210 having a center 212a and a radius 220. The respective centers 212a of the first openings together define a first pivot axis 212 (FIG. 3A). The illustrated arcuate segment 202 extends circumferentially about the pivot axis 212 by an angle α and comprises a convex outer drive-surface 201 and a concave inner surface. In the embodiment of FIG. 1, the angle α is about 180 degrees, such as between 170 degrees and 190 degrees, with 180 degrees being a desirable example. However, in some embodiments, the angle α is less than about 180 degrees, for example between about 100 degrees and about 170 degrees. See FIG. 8B for an embodiment having an angle α less than 180 degrees. In other embodiments, the angle α is more than 180 degrees, for example from 190 degrees to 210 degrees. As more fully described below, the configuration of these arcuate segments affects the manner in which the link 200 contacts a sprocket and stand in stark contrast to chains having cylindrical sleeves (shown in dashed lines in FIG. 1 as feature 207) extending 360 degrees around the first axis, such as in conventional roller chains. It has been discovered that sprockets for driving chains with arcuate segments should be configured differently from sprockets for driving chains with cylindrical sleeves, particularly in embodiments having six to twelve teeth.

Figure 3B:
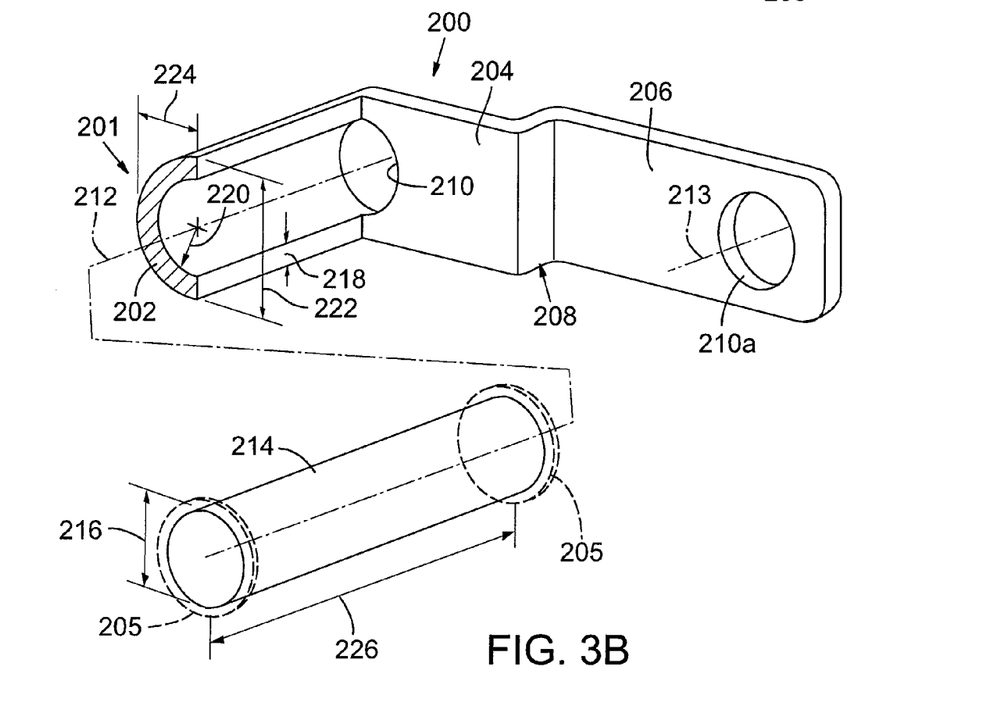
FIG. 3B illustrates a partially-sectioned isometric view of a link, similar to the link of FIG. 1, together with a pin such as can be used in the pinned connection of FIG. 3A.

As suggested above, arcuate segments extending partly around a pivot axis comprise a convex outer surface, such as the drive-surface 201, and a concave inner surface forming a sleeve portion. This sleeve portion at least partially extends around a connection member, such as the pin 214 shown in FIG. 3B. As more fully described below with regard to FIGS. 5-9, the drive-surface 201 desirably engages a corresponding drive portion of a sprocket tooth, rolling along a surface of the tooth as the link 200 contacts and separates from the tooth.

In general, arcuate segments have a characteristic outer diameter and a characteristic outer radius. As used herein, "characteristic outer radius" means a radial length measured from the first pivot axis to the outer surface of the arcuate segment along a first major axis of the arcuate segment. In the embodiments shown in FIGS. 1-3B, the characteristic outer radius 224, 224' extends substantially longitudinally of the link 200, 200'. As used herein, "characteristic outer diameter" means twice a substantially radial length measured from the first pivot axis to the outer surface of the arcuate segment along a second major axis of the arcuate segment. In the embodiments shown in FIGS. 1-3B, the characteristic outer diameter 222, 222' extends substantially perpendicularly to the axis along which the characteristic outer radius 224, 224' is measured. (See FIG. 1.) In some desirable embodiments, the characteristic outer diameter measures at least three-quarters of an inch.

In the embodiments of FIGS. 1 and 2-3B, the arcuate segment is substantially cylindrical and the radial length varies only negligibly (such as from manufacturing variations) with selected major axes. In other words, the exemplary drive-surface 201 has a characteristic outer diameter 222 twice the characteristic outer radius 224 (e.g., the contour of the exemplary drive-surface 201 is at least in part cylindrical).

Figure 1A:
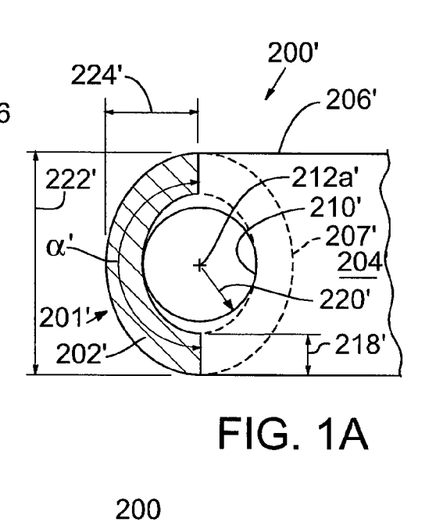
FIG. 1A illustrates a sectional side-view of another exemplary chain link.

In the embodiment shown in FIG. 1A, the arcuate segment 202' is elliptical and has other than a two-to-one relationship between the characteristic outer radius 224' and the characteristic outer diameter 222'. This is because the elliptical shape of the arcuate segment 202' has an outer radius that varies with angular position. Although circular and elliptical arcuate segments have been illustrated by way of example, other arcuate segment geometries are possible, such as those arising from stamping a metal plate to form the link 200. In general, arcuate segments can have a characteristic outer diameter 222' greater than or less than twice the characteristic outer radius 224'.

Arcuate segments have a wall thickness 218 between the concave inner surface and the convex outer surface, and in many instances the wall thickness 218 is selected at least in part based on the loads that the chain is anticipated to experience during use. In the embodiment of FIG. 1, the concave inner surface of the arcuate segment 202 substantially coincides with the circumference of the first opening 210. In other words, the radius 220 of the first opening 210 is substantially the same as the radius of the concave inner surface of the arcuate segment 202. In other embodiments, the inner surface is spaced from the circumference of the first opening 210 and can have an inner surface contour that is concentric, substantially concentric or non-concentric with the circumference of the first opening 210.

Although many link configurations are possible, the exemplary link 200 has a clevis-like portion 230 (best seen in FIG. 3A) formed by a pair of second, spaced-apart sidewall portions 206 each diverging or flaring from a respective first adjoining sidewall portion 204 through a transition portion 208. The opposing second sidewall portions 206 of the clevis-like portion 230 each define a second opening 210a having a center 213a. The opposing pair of centers 213a defines a second pivot axis 213. Thus, each exemplary link 200 comprises a first pivot axis 212 and second pivot axis 213. The characteristic distance between adjacent pinned connections, e.g., the distance by which the first pivot axis 212 and the second pivot axis 213 are spaced, is referred to herein as the "chain pitch," and is an important parameter for matching a sprocket to a chain, as described more fully below.

Figure 2:
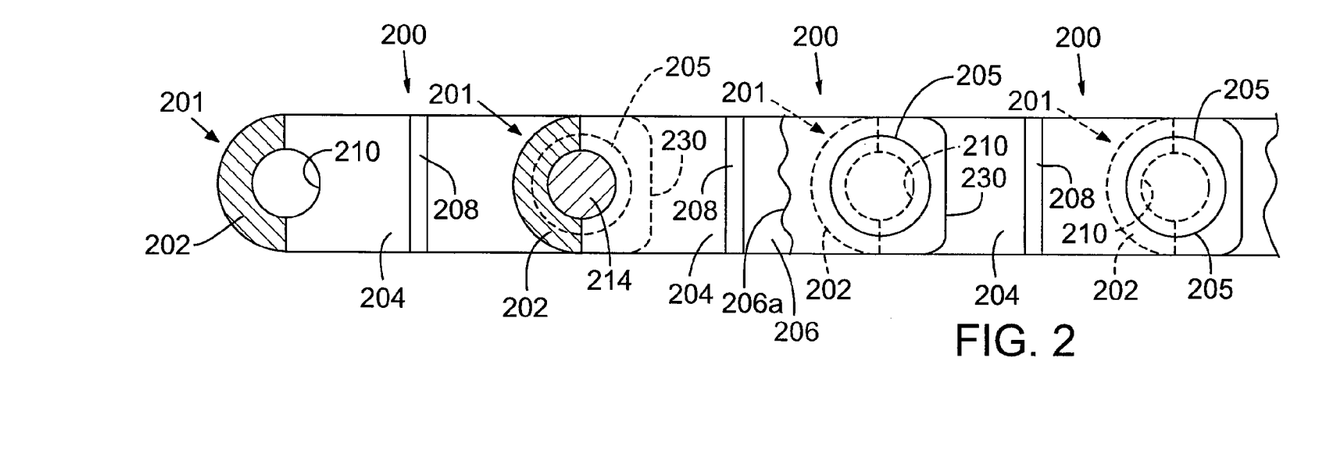
FIG. 2 illustrates a partially-sectioned side view of an exemplary chain of links comprising plural links as shown in FIG. 1.

A chain as might be used in a drive-train, for example the chain of FIG. 2, can be formed by pivotally connecting a plurality of links 200. Plural links 200 can be joined end-to-end (see FIG. 3A) by pivotally connecting the arcuate segment 202 of one link with the clevis-like portion 230 of a second link, such as through a pivotable connection using a pin 214. In this embodiment, the pin 214 has an outer diameter 216 corresponding to the diameter of the openings 210, 210a and a length 226 corresponding to the outermost dimensions of the clevis-like portion 230. In the exemplary embodiment of FIGS. 2-3B, the pin 214 has expanded end portions 205, such as can result from peening, to retain the pin 214 and prevent disengagement from the links 200 (e.g., moving along the pivot axis). Alternative pin configurations can be used.

From left to right, FIG. 2 illustrates a partially-sectioned side view of an exemplary chain of links 200. The left-most link 200 is shown in section, similar to the link shown in FIGS. 1 and 3B. The next link, shown in partial section, pivotally joins a sectioned pin 214. Moving right from the section line 206a, a portion of the second side-wall portion (forming a part of the clevis-like portion) is shown pivotally joining the arcuate segment of the next link to the right.

FIG. 3A illustrates an isometric view of a pair of links 200 joined in similar fashion to the links 200 shown in FIG. 2. Chains of this type are sometimes referred to as pintle chains.

Figure 4:
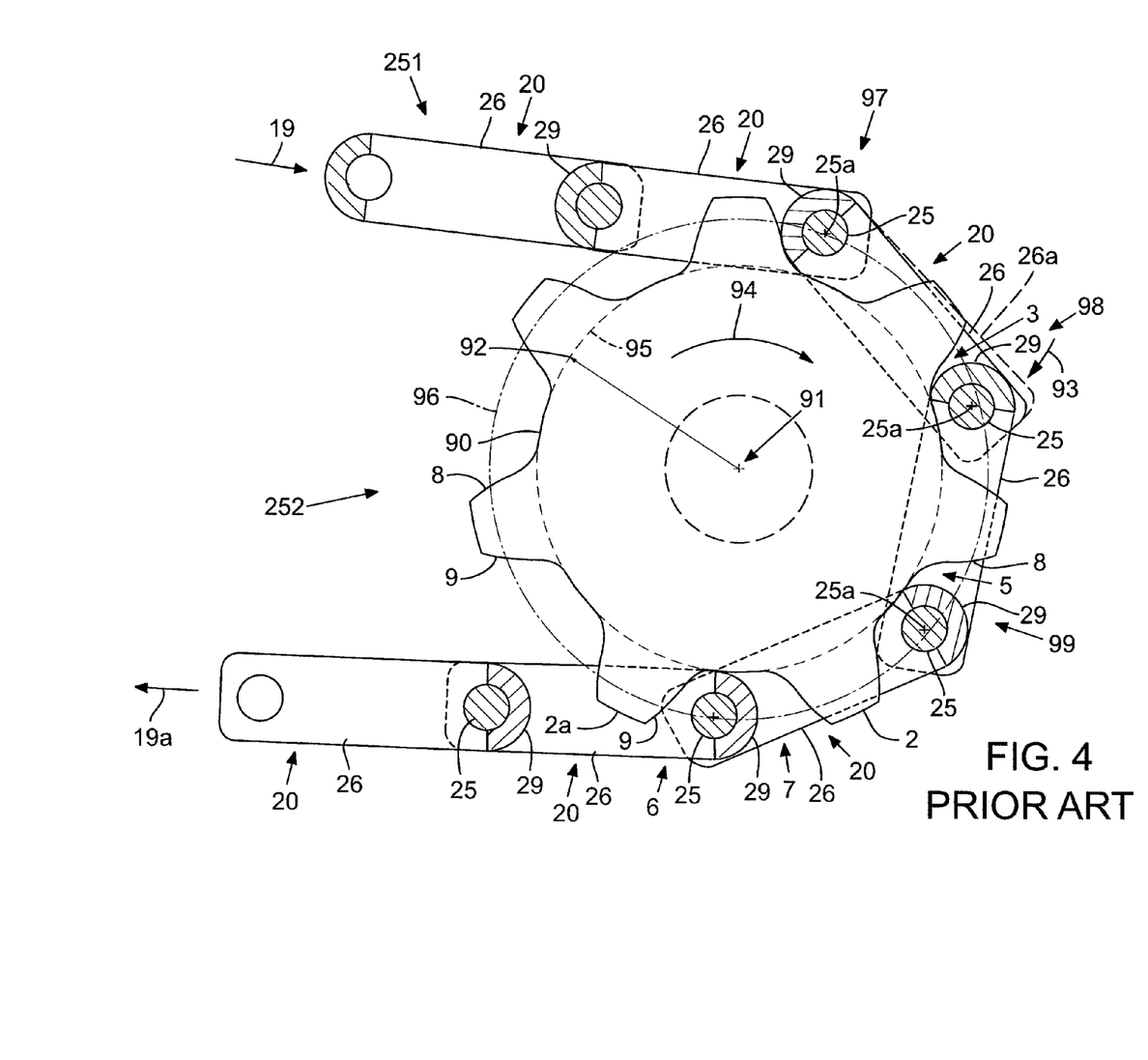
FIG. 4 illustrates a side view of the misalignment between a prior art sprocket having fewer than twelve teeth and a chain having arcuate segments at each pinned connection, such as the chain illustrated in FIG. 2.

FIG. 4 illustrates a side view of a chain 251 of the type just described being driven by a prior art sprocket 252. The chain 251 is not driven by more than one tooth on the prior art sprocket 252 at a time and one or more misaligned links 20 "kick" (indicated by the arrow 93 and the dashed line 26a to solid line 26 movement of one of the links) as the sprocket 252 rotates (indicated by arrow 94) about its center 91. As used herein "kick" means a secondary motion of a link, such as for example, motion adjusting a link's position relative to the sprocket as the sprocket rotates and another link drivingly contacts and/or separates from driving contact with a tooth of the sprocket. Because the chain kicks, tension in the chain varies and causes unsteady loading of other drive-train components, such as hydraulic drives. After the arcuate segment 98 kicks, the arcuate segment contacts the sprocket (albeit through a misaligned contact 3) and spaces the pivot axis 25a of the arcuate segment 99 from the pitch circle 96, which in turn spaces the corresponding drive-surface 29 from the corresponding tooth drive-surface 8 as well (see gap 5). Similarly, the drive-surface 29 of the arcuate segment clockwise of the arcuate segment 99 and its corresponding drive-tooth 2 are separated by a gap 7. Although the respective pin member 25 is spaced from its leading tooth 2A by a gap 6, the pin member 25 can impact the trailing surface 9 of the leading tooth 2A. In many instances, repeated impacts between the pin member 25 and the trailing surface 9 of the leading tooth 2A causes the pin member 25 to eventually break.

Similar to the chains described above with regard to FIGS. 1-3B, the chain 251 has a plurality of links 20, each having a clevis-like portion formed by opposing side portions 26 pivotally coupled to an arcuate segment portion of an adjacent link 20 with a pin member 25. Each pair of adjacent links 20 can thus pivot about a respective pivot axis 25a. This allows the drive-surface 29 of a link to roll along a corresponding sprocket drive-surface 8 of the tooth that happens to be in driving contact with the chain.

As shown, the FIG. 4 sprocket 252 has a generally circular body with a root diameter being twice the radius 92, and a corresponding periphery having a root circumference 95, from which periphery the teeth 2 extend. The sprocket of the FIG. 4 design has a pitch circle 96. Also, each of the plurality of teeth 2 has a leading drive-surface 8 and a trailing surface 9 with regard to the direction of rotation 94. The leading surface 8 of only one tooth is positioned to drive a link of the chain 251.

In contrast, some sprockets in accordance with the present disclosure are designed such that a plurality of teeth can each simultaneously and drivingly engage (drive or be driven by) an arcuate drive surface of a respective chain link. As shown in the example of FIG. 6, sprockets in accordance with this disclosure have a pitch circle, such as the illustrated pitch circle 46, that is concentric with the root circumference, e.g., the root circumference 45, and has a radius larger than the root circumference.

Figure 6:
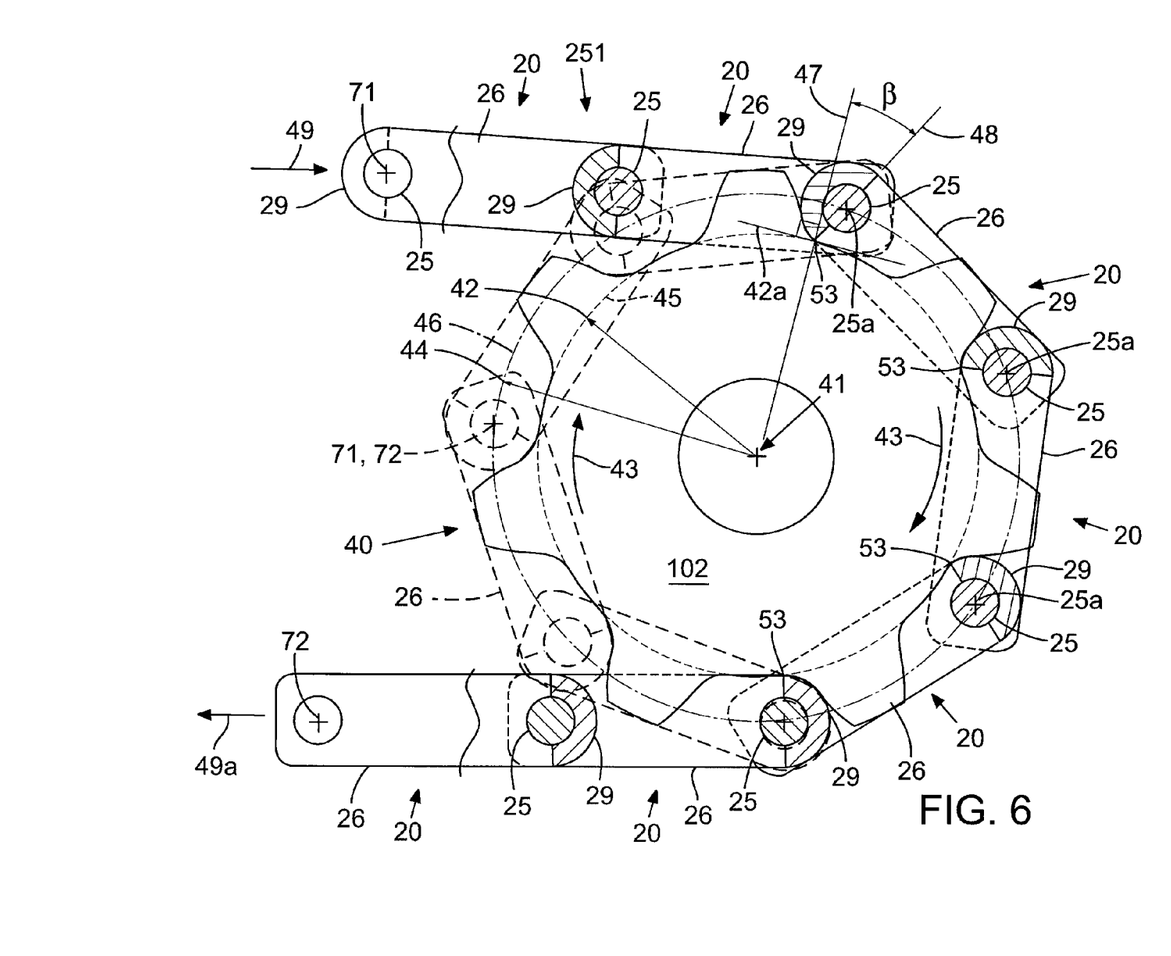
FIG. 6 is a schematic illustration of the drive-train sprocket shown in FIG. 5 engaging a chain having arcuate segments, each arcuate segment defining a drive-surface, and also showing a portion of a chain in dashed lines in a position occupied by the chain if wrapped around the sprocket.

A chain that is simultaneously engaged by, or drivingly engages, such as shown in FIG. 6, a plurality of sprocket teeth, and hence is in proper alignment with the sprocket, has each respective pivot axis located, or approximately located, on the pitch circle. Thus, the diameter of the pitch circle corresponds to at least the number of teeth on the sprocket and the chain pitch (i.e., characteristic distance between adjacent pinned connections).

As noted above, the sprocket configuration relative to that of the chain, particularly the chain pitch and the configuration of the sprocket-engaging portions of a split-barrel or an arcuate segment chain affects the manner in which each link in the chain contacts the sprocket and is different from full barrel chain links. In other words, the chain pitch, the sprocket-engaging portion configuration and the sprocket configuration must be mutually compatible (e.g., the pivot axes should be located on the pitch circle) for a plurality of chain link drive surfaces and sprocket teeth to drivingly to engage each other.

As used herein, "engagement between a chain and a sprocket" means that the drive-surface of the arcuate segment is located in a seated position against the tooth, such that neither the drive-surface nor the corresponding link undergoes secondary motion as the sprocket pivots throughout a full sprocket rotation. When in a seated position, the chain's arcuate drive-surface and a sidewall portion of a tooth desirably engage one another along a drive surface spaced from the root circumference of the sprocket.

Figure 5A:
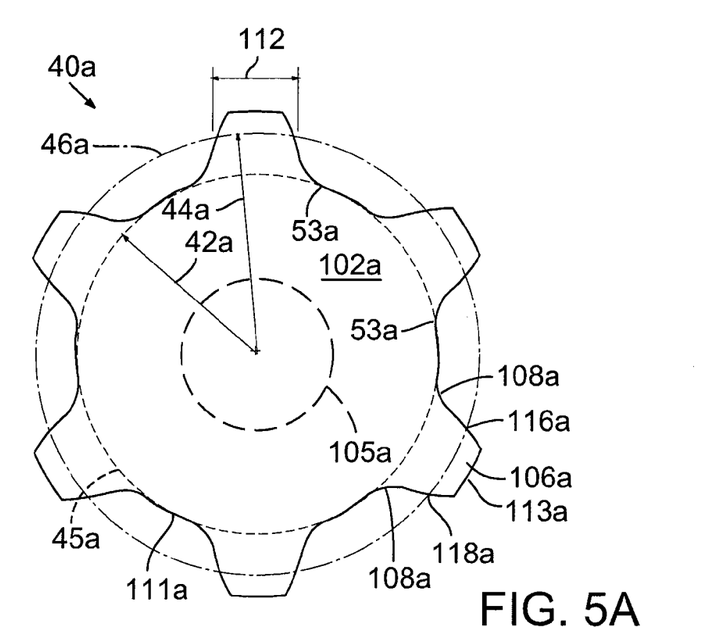
FIG. 5A is a schematic illustration of an embodiment of an exemplary six-tooth drive-train sprocket, as disclosed herein, for engaging a chain of links each having arcuate segments defining a drive-surface at each pinned connection, such as the chain illustrated in FIG. 2.
Figure 5B:
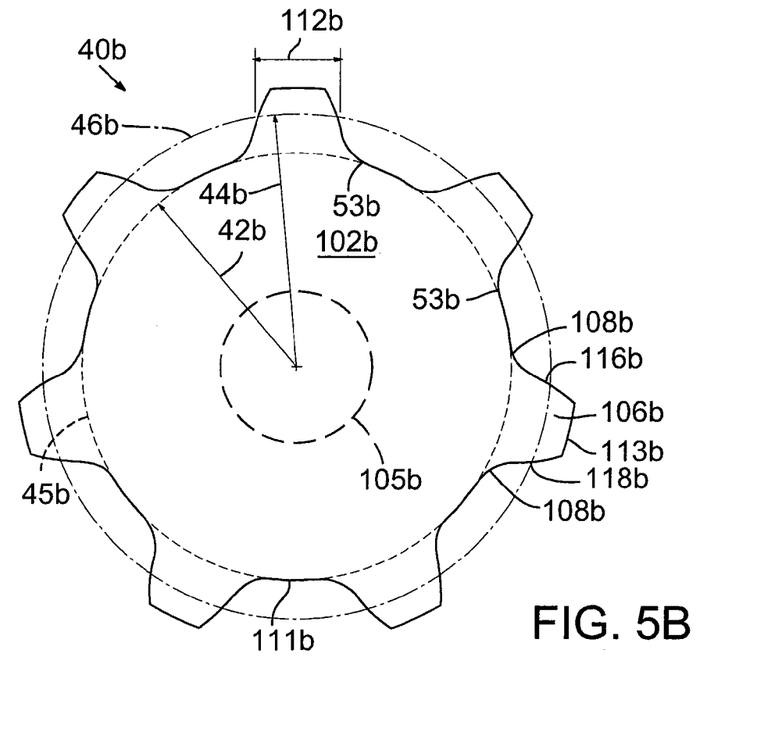
FIG. 5B is a schematic illustration of an embodiment of an exemplary seven-tooth drive-train sprocket, as disclosed herein.
Figure 5C:
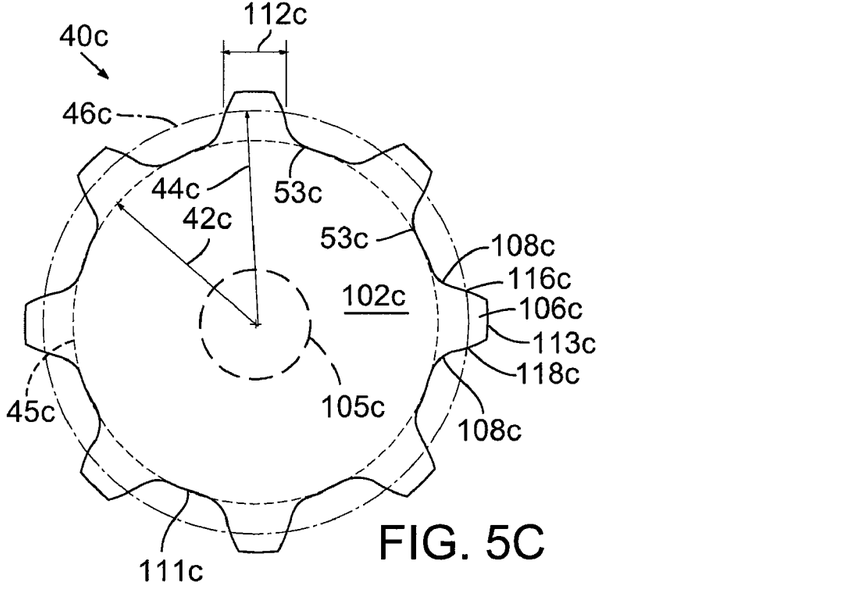
FIG. 5C is a schematic illustration of an embodiment of an exemplary eight-tooth drive-train sprocket, as disclosed herein.
Figure 5D:
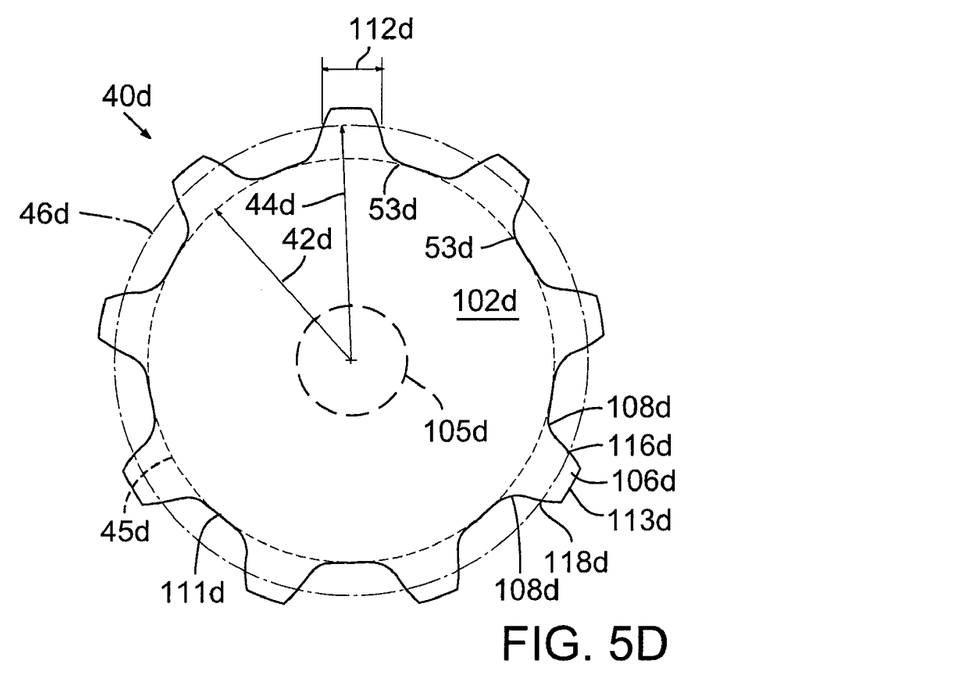
FIG. 5D is a schematic illustration of an embodiment of an exemplary nine-tooth drive-train sprocket, as disclosed herein.
Figure 5E:
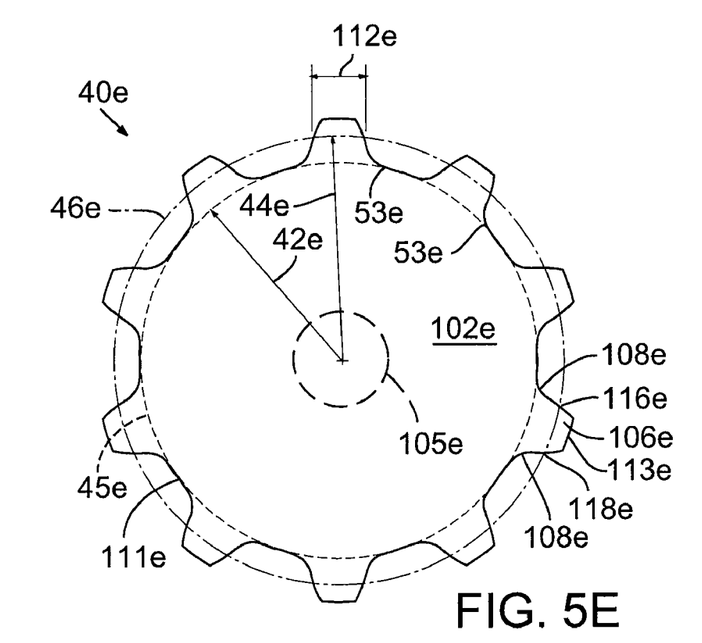
FIG. 5E is a schematic illustration of an embodiment of an exemplary ten-tooth drive-train sprocket, as disclosed herein.
Figure 5F:
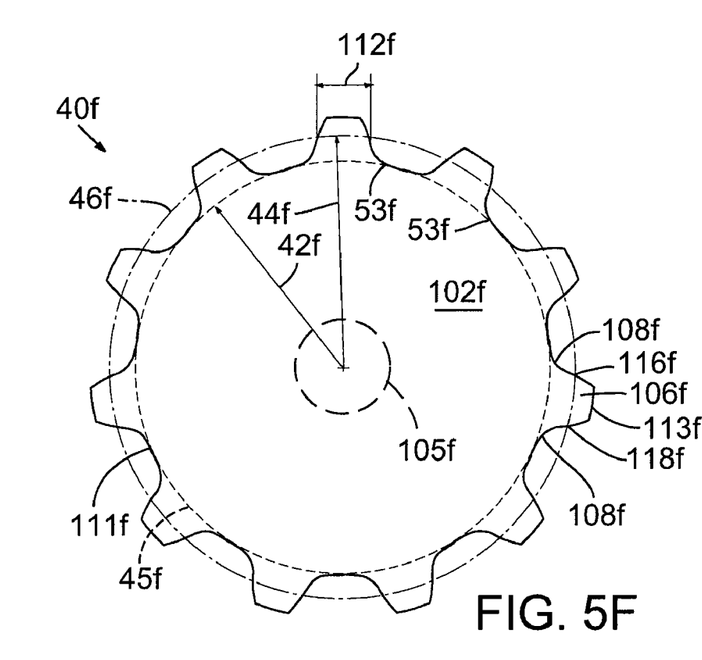
FIG. 5F is a schematic illustration of an embodiment of an exemplary eleven-tooth drive-train sprocket, as disclosed herein.
Figure 7:
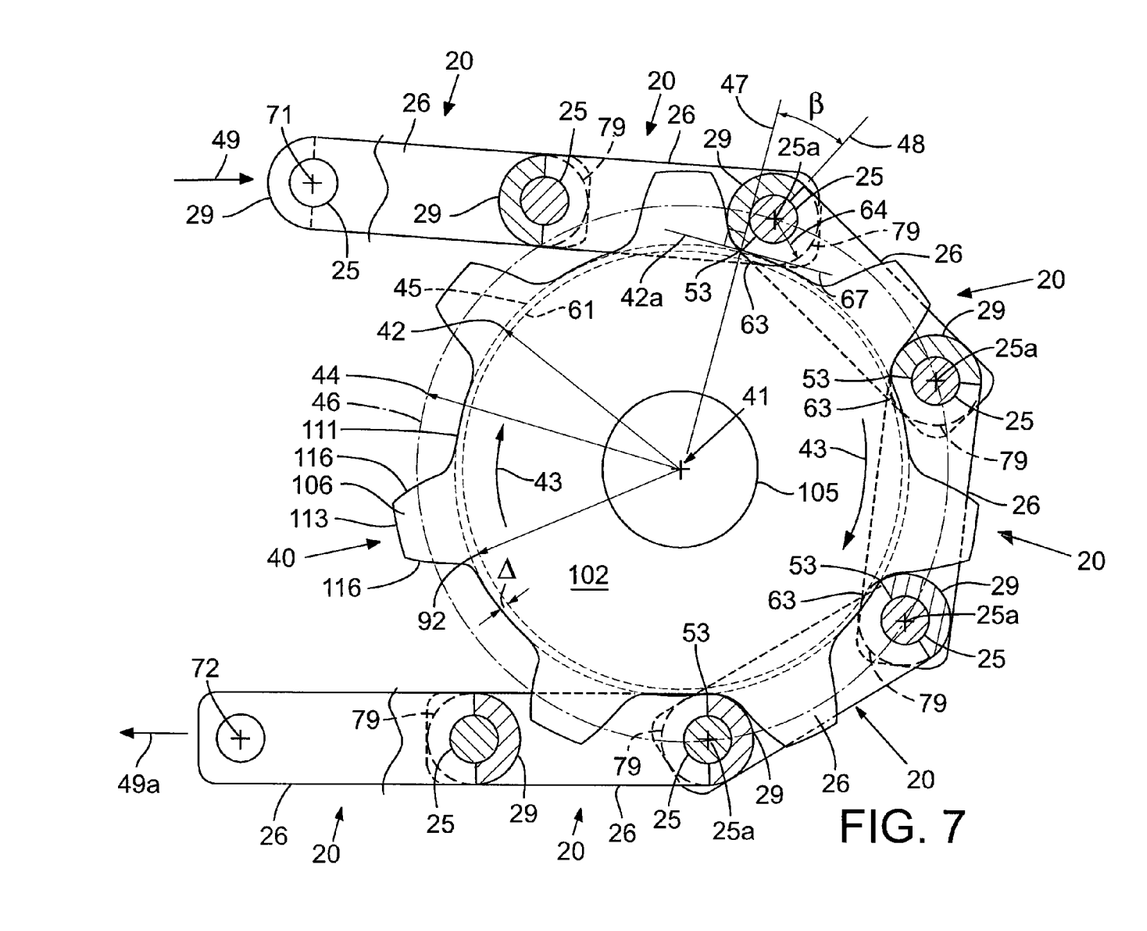
FIG. 7 is a schematic comparison between the drive-train sprocket of FIGS. 5 and 6, and the prior art sprocket of FIG. 4.

The sprockets 40b, 40 of FIGS. 5B, 6 and 7 (all having seven teeth) are configured in accordance with an embodiment of this disclosure to drivingly engage plural links of a chain having arcuate segments. Such a chain, for example the chain 251, can smoothly contact and separate from the sprocket without substantial secondary motion between the sprocket and the chain. One difference between sprockets as disclosed herein and prior art sprockets is the larger body radius of the disclosed sprockets, as shown by 0 in FIG. 7. For example, the sprocket 40 has a larger body radius 42 (and corresponding root diameter) than the prior art FIG. 4 sprocket 252 which had a body radius 92. Sprockets having larger root diameters as disclosed herein locate each respective pivot axis on the pitch circle of the respective sprocket throughout the chain and sprocket engagement. See FIG. 6. Surprisingly, this change allows plural teeth to simultaneously drivingly engage respective arcuate drive surfaces of respective links and virtually eliminate kick.

Each sprocket shown in FIGS. 5A-5F has body radius sized to support the pinned connections of open barrel chains such that the pivot axes of the chain are positioned on the pitch circle of the respective sprocket. In FIGS. 5A-5F, similar features among the sprockets are indicated by alphanumeric characters, where the numeric portions are identical for similar features and the alphabetic portion corresponds to the figure number. For example, in FIGS. 5A-5F, the pitch circles bear respective reference characters 46a-46f.

With reference to FIG. 6, the sprocket 40 has a body 102 with a radius 42 (and corresponding root circumference 45) and a pitch circle 46 of radius 44. The sprockets of FIGS. 5B, 6 and 7 have seven teeth 106b, 106 extending substantially radially from the body 102b, 102, which teeth are spaced circumferentially and evenly about the body. The sprockets 40, 40b, concentrically locate a plurality of adjacent pivot axes of the chain relative to the circumference of the body. That is a plurality of adjacent pivot axes 25a of chain links are located on the circumference of a circle centered about the sprocket's axis-of-rotation, such as for example on the respective pitch circles 46, 46b. A fillet portion 108a-f (FIGS. 5A-5F) can be used to smoothly transition the contour of each tooth surface 116a-f, 118a-f to the outer surface 111a-f of the body 102a-f. Each tooth has a characteristic width 112a-f that can be selected at least in part based on the load anticipated for the teeth during operation. The sprocket 40a-f has an ideal point of contact 53a-f corresponding to each tooth 106a-f between the outer surface 111a-f and the drive-surface 29 of the chain. See for example FIG. 7.

Figure 9:
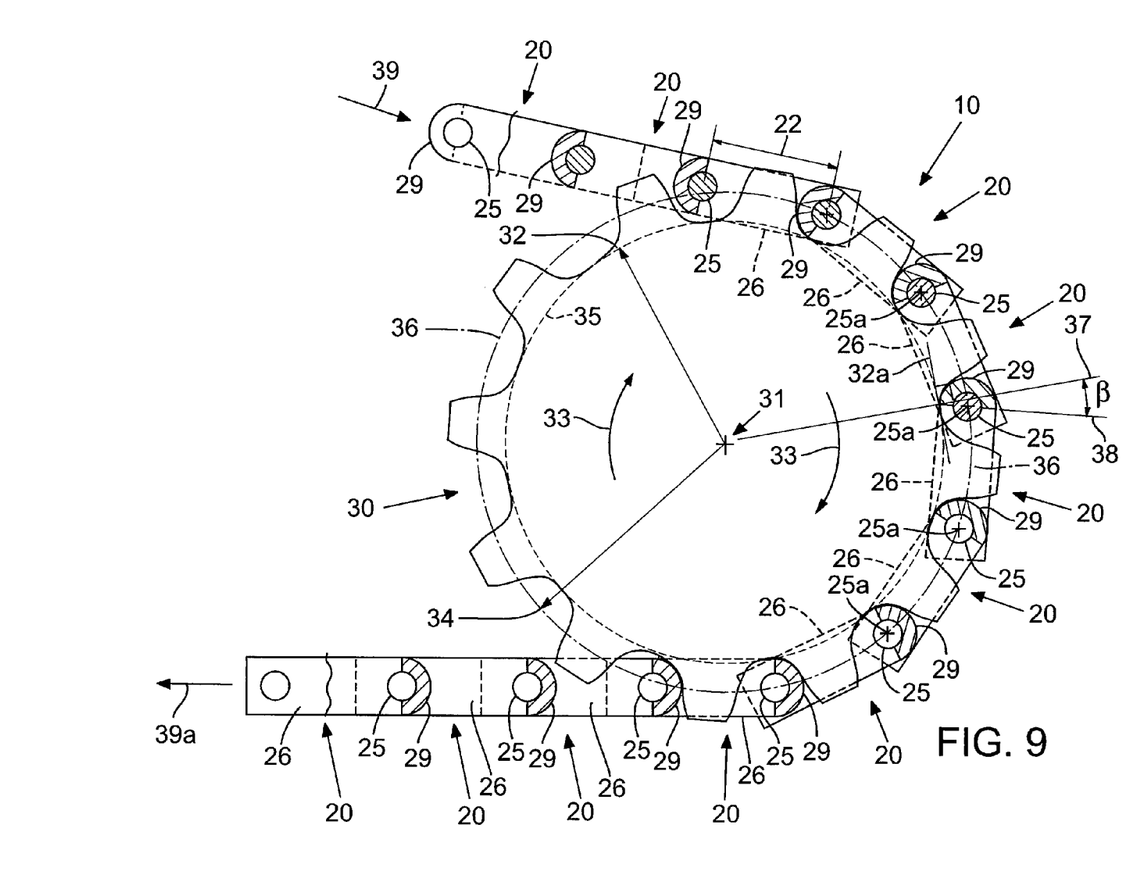
FIG. 9 is a schematic illustration of an exemplary twelve-tooth drive-train sprocket, as disclosed herein, engaging a chain having arcuate segments, such as the chain illustrated in FIG. 2.

FIG. 6 illustrates, in a seven-tooth embodiment, such as those shown in FIGS. 5b, 6 and 7, four teeth of the sprocket 40 simultaneously and drivingly engaging the drive surfaces of the chain 251. In some drive-trains, a pintle chain engages fewer teeth of the sprocket simultaneously, such as two or three teeth if links of the chain 251 contacts and separates from the sprocket 40 at a different (i.e., larger) angle than that shown in FIG. 6, or if the number of teeth is reduced to six. In other embodiments, a chain having open-barrel chain engaging portions, or alternatively arcuate segments, engages more than four teeth, such as seven teeth as illustrated in FIG. 9. Alternatively, more than four teeth can be engaged if a chain contacts and separates from the sprocket at a different (i.e., smaller) angle than illustrated in FIG. 6.

As the sprocket 40 rotates about its axis-of-rotation 41 (e.g., clockwise as shown by the arrows 43), each pivot axis 25a remains located on the pitch circle 46 and each drive-surface 29 contacts the body at the ideal location 53. The larger root diameter of the sprocket 40 results in locating the pivot axes 25a on the pitch circle 46.

Wrapping a section of chain around a sprocket provides one measure of whether the sprocket, such as the sprocket 40, has a root diameter sized to maintain the pivot axes of an open barrel chain on the pitch circle. A section of open barrel chain with opposing first and second ends and having the same number of links as the sprocket has teeth, when wrapped around a sprocket having a root diameter sized in accordance with this disclosure, simultaneously engages each sprocket tooth and places the links of the opposing first and second ends, and the respective pivot axes 71, 72 of these links, in substantial alignment such that the respective pivot axes are coincident, or almost coincident, as shown by dashed lines in FIG. 6.

As used herein "substantial alignment" means that the respective axes are separated by less than three-sixteenths to one-quarter of an inch. In a desirable configuration, the substantially aligned axes of a chain section selected as described immediately above and wrapped around a sprocket are sufficiently coaxial such that the links of the opposing first and second ends are positioned such that they could receive a pin member (if one were inserted therethrough) suitable for pivotally joining adjacent links of the chain. The links of FIG. 6 are thus in substantial alignment, and each of the teeth of the sprocket engage the corresponding drive surfaces of the section of chain.

A desirable root radius, such as radius 42, for a sprocket in accordance with this disclosure, can be determined as follows with reference to FIGS. 8A and 8B. A first radial line 47 passing through an exemplary ideal tooth-to-chain contact location 53 is positioned perpendicular to a line 42a tangent to the root circumference 45. A second radial line 48 can be located to pass through the pivot axis 25a of the pinned connection 25 and the ideal location 53. The angle β between the first radial line 47 and the second radial line 48 corresponds, at least in part, to the geometrical relationship between to the number of teeth on the sprocket 40 and the extent to which the arcuate segment extends circumferentially about the pivot axis 25 (e.g., the angle α of FIG. 1).

Figure 8A:
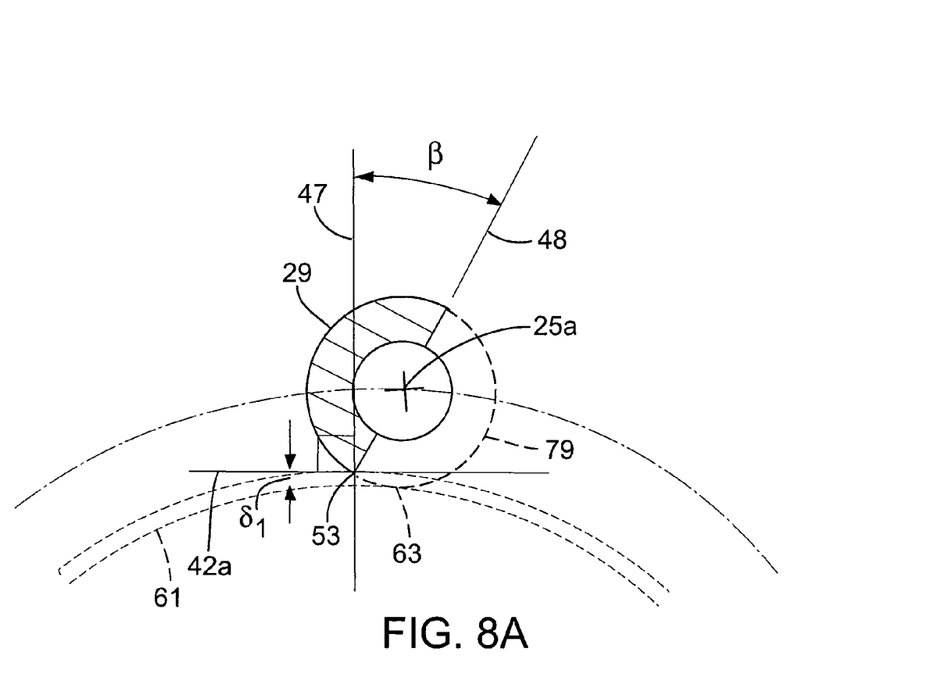
FIGS. 8A and 8B are schematic illustrations of contact between an arcuate segment and a drive-train sprocket.
Figure 8B:
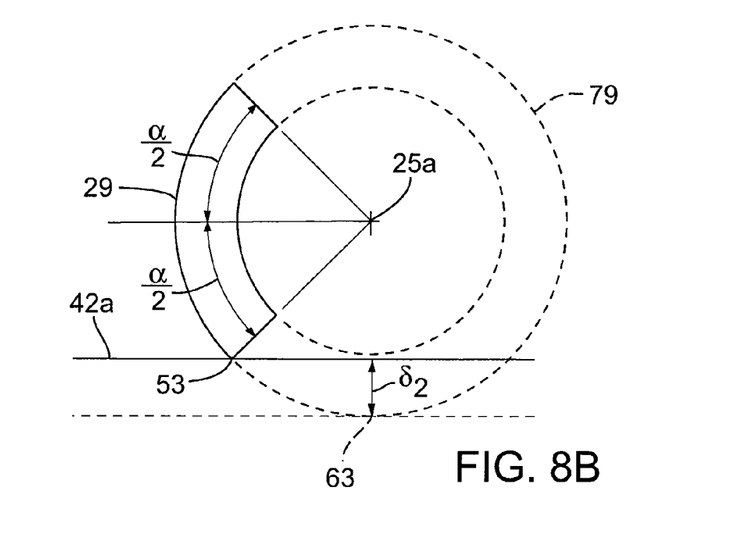

As best seen in FIGS. 8A and 8B, which compare the contact between an arcuate segment and the sprocket with that between a hypothetical cylindrical sleeve 79 (dashed lines) and the sprocket, at each ideal location 53, the drive-surface 29 contacts the body of the sprocket 40 such that a tangent to the drive surface 29 located at the ideal location 53 is oriented at an angle different from the tangent line 42a (tangent to the sprocket body) located at the ideal location 53. By way of analogy, the split barrel configuration of the pinned connection causes the point of contact 53 between the sprocket 40 and the drive-surface 29 to act as a fulcrum. As a consequence, the pivot axis 25a (and the pitch circle) is closer to the root circumference than if the arcuate segment formed a cylindrical sleeve. It was discovered that in order to compensate for this effect, the sprocket 40 should have a larger root diameter (or radius 42) than the root diameter (or radius 92) of a prior art sprocket in order to locate the pivot axes 25a on the pitch circle 46.

For a chain with a given pitch and characteristic outer diameter of the drive-surface, the angle β increases as the number of teeth decreases. For example, if a chain is wrapped entirely around a sprocket having 10 teeth, each pivotal connection will pivot on average by an angle β of 36-degrees (e.g., 360 degrees in a circle, divided by ten points of pivoting). If the number of teeth drops to 6, each pivotal connection will pivot on average by and angle β of 60-degrees. As noted above, FIG. 8A illustrates that, as the angle β increases, the spacing between the pivot axis 25a and the root circumference of the sprocket body decreases (by a distance $\delta_1$) for a chain having an arcuate segment because the arcuate segment "tips" more as the angle β increases. As shown by FIG. 8B, this distance also decreases (by a distance $\delta_2$) as the angle α decreases, i.e., as the drive-surface 29 of the arcuate segment circumferentially extends about the pivot axis 25a by a smaller angle, the distance $\delta_2$ also decreases. The distance Δ can be estimated as being the sum of the distances $\delta_1$ and $\delta_2$.

Thus, as the number of teeth on a sprocket for engaging a pintle chain decreases, and as the angle α decrease, the root circumference of the sprocket should grow larger (toward the pitch circle), and away from the root circumference of a sprocket for engaging a chain having cylindrical sleeves at each pinned connection to place the pivot axes on the pitch circle. The distance Δ increases as the number of teeth on the sprocket decreases for a particular pintle chain configuration.

FIG. 9 illustrates a sprocket 30 having twelve teeth engaging a section of open-barrel chain as described above with regard to FIG. 7. Reference numerals for features of the sprocket 30 that are similar to features of the sprocket 40 shown in FIG. 7 are numbered ten less than the features in FIG. 7.

Figure 10:
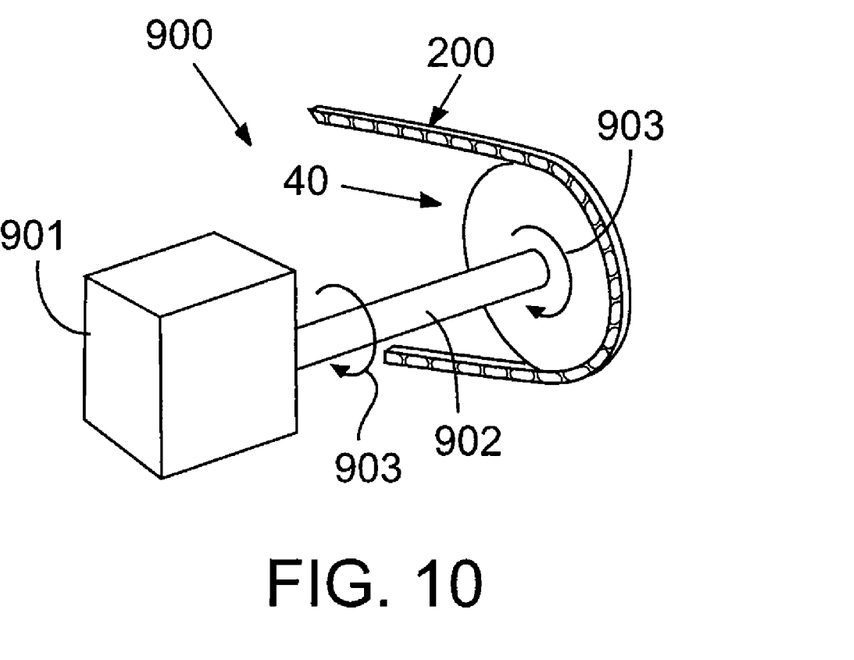
FIG. 10 is a schematic illustration of a drive-train, as disclosed herein.

As indicated in FIG. 10, a drive 901, such as for example a hydraulic drive, an electric motor, an internal combustion engine, or other drive means, can be used to drive a drive-train sprocket in rotation 903 and thus drive a chain, such as a chain comprising the links 200 (see FIG. 1). In most instances, using a drive-train, such as the exemplary drive-train 900, to drive the sprocket at a substantially constant speed with a torque free of substantial variation or surges is desirable. The drive 901 can be coupled to the sprocket by a shaft 902. If a hydraulic drive is used to drive a prior art sprocket having fewer than thirteen teeth and engaging arcuate segments of a chain, the secondary motion described above can cause the hydraulic drive to vary in speed. Alternatively, if driven at constant speed, such secondary motion causes large variations, e.g., surges, in torque. These surges and/or speed variations can damage the hydraulic drive.

In contrast, a sprocket in accordance with this disclosure (e.g., the sprocket 40) for engaging arcuate segments imparts little or no secondary motion to the chain. Consequently, the properly sized sprocket can be driven at a substantially constant speed by a torque having no or negligible variation throughout a full sprocket rotation. Such sprockets in accordance with this disclosure are desirable, at least in part, because they reduce the likelihood of damaging a hydraulic drive, as well as premature chain wear or breakage, as discussed above.

Although embodiments of drive-sprockets (e.g., sprockets used to drive chains having open-barrels) have been disclosed above, this disclosure also concerns sprockets being driven by chains having open-barrels, such as for example idler sprockets.

EXAMPLE

A prior art seven-tooth sprocket was designed and fabricated for a chain having cylindrical sleeves of about 0.938 inch outer diameter (barrel diameter) at each pinned connection, and a pitch of about 2.609 inches between adjacent pivot axes. The prior art sprocket had a root diameter of about 4.92 inches. A pintle chain having arcuate segments with a characteristic outer diameter of about 0.938 inch and a pitch of about 2.609 inches was driven by the prior art sprocket. Each link in the pintle chain kicked so violently under load and before separating from the sprocket that the pin member of the kicking link impacted the adjacent sprocket tooth and eventually fractured prematurely.

A replacement sprocket in accordance with this disclosure was flame cut from about one-inch thick plate steel with a root diameter of 5.083 inches, an increase of 0.163 inches, over the prior art sprocket's root diameter. The replacement sprocket having a root diameter corresponding to the arcuate segments substantially eliminated link kicking, and substantially reduced secondary motion of the chain, improving chain life. Moreover, surges in torque were significantly reduced, and in some instances eliminated, when driving the chain at constant speed. Consequently, overall drive-train reliability and service life was improved.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. I therefore claim as my invention all that comes within the scope and spirit of these claims.

I claim:

1. A drive-train sprocket for engaging a chain having a plurality of links joined by a corresponding plurality of pinned connections spaced longitudinally of each other along the chain, each of the pinned connections having a respective pivot axis and joining at least a first link and a second link, each of the at least first link and second link being substantially identical to each other and having a clevis-like portion and an arcuate segment defining a drive-surface with a characteristic outer diameter, wherein the arcuate segment of the first link pivotally engages the clevis-like portion of the second link to form the pinned connection, and wherein the arcuate segment of the first link extends circumferentially about only a portion of the pivot axis by an angle such that the drive-surface extends circumferentially between two terminal edges, the drive-train sprocket comprising:
a body having a root diameter and a corresponding root circumference; and
a plurality of teeth circumferentially spaced about the root circumference and extending radially outwardly from the body, each tooth defining a tooth drive-surface contoured to substantially rollingly-engage a drive-surface of the chain, wherein each tooth drive-surface joins the base at a respective tooth-base juncture on the root circumference; wherein,
the root diameter geometrically corresponds to at least the number of the plurality of teeth, the characteristic outer diameter of the drive surface and the angle by which each arcuate segment extends circumferentially about the corresponding pivot axis, such that the root diameter is configured to concentrically locate a plurality of adjacent pivot axes on a pitch circle of the sprocket with at least two of the arcuate segments associated with the plurality of adjacent pivot axes engaged with the sprocket such that, for each of the at least two arcuate segments, one of the terminal edges of the drive-surface is in contact with a tooth-base juncture of the sprocket.

2. The drive-train sprocket of claim 1, wherein the root diameter further geometrically corresponds to at least a characteristic distance between adjacent pinned connections of the longitudinally spaced plurality of pinned connections.

3. The drive-train sprocket of claim 1, wherein the plurality of teeth ranges from six teeth to twelve teeth.

4. The drive-train sprocket of claim 1, wherein the plurality of teeth numbers seven.

5. The sprocket of claim 4, wherein the longitudinal spacing of the first pivot axis from the second pivot axis is about 2.6 inches.

6. The drive-train sprocket of claim 5, wherein the root diameter is greater than five inches.

7. The drive-train sprocket of claim 1, wherein the root diameter is sized such that for a chain section having a plurality of links numbering the same as the number of teeth of the plurality of teeth of the drive-train sprocket, a first end having a clevis-like portion with a first axis and a second end having an arcuate segment with a second axis, the chain section can be wrapped around the sprocket to place the first axis and the second axis in substantial alignment with each other.

8. A drive-train sprocket for engaging a pintle chain having a plurality of longitudinally-spaced pinned connections, each pinned connection defining a pivot axis and comprising at least one open-barrel roller having a characteristic outer-diameter extending around only a portion of the corresponding pivot axis by an angle, the sprocket comprising:
a substantially circular body having a characteristic root diameter and a corresponding circumference; and
a first plurality of teeth numbering from six to twelve and being circumferentially-spaced about the body, each tooth defining a chain-engaging portion for engaging a corresponding portion of the pintle chain;
wherein the root diameter geometrically corresponds to the characteristic outer-diameter of the open-barrel rollers, the angle by which the characteristic outer-diameter extends around the corresponding pivot axis and the longitudinal spacing of the pinned connections, such that the body is configured to urge a plurality of open barrel rollers outwardly of the body and locate the pivot axes corresponding to the plurality of open barrel rollers the same distance from a center of the sprocket, and wherein the radius of the plurality of open-barrel rollers is greater than the distances from the corresponding pivot axes to the circumference of the body.

9. The sprocket of claim 8, wherein the circular body and each of the teeth are together configured such that the chain-engaging portions defined by each of a second plurality of teeth are configured to simultaneously engage a plurality of adjacent links of the pintle chain, wherein the second plurality is a subset of the first plurality.

10. The sprocket of claim 9, wherein the second plurality numbers three.

11. A drive-train comprising:
a pintle chain having a plurality of longitudinally-spaced pinned connections each comprising a pin and at least one open-barrel roller circumferentially extending about only a portion of the pin and having an outer drive surface that is concentric with the pin, the outer drive surface extending between first and second edges of the open-barrel roller;
a sprocket comprising a body bounded by a root circumference and six to twelve teeth extending from the body and each of said teeth having a base at the root circumference for driving the pintle chain, wherein the base of at least two of the teeth simultaneously engage the edge of a respective open-barrel roller of the pintle chain.

12. The drive-train of claim 11, wherein, as the sprocket rotates to drive the pintle chain, the pintle chain smoothly engages and disengages the sprocket without secondary motion between the sprocket and pintle chain.

13. The drive-train of claim 11 further comprising:
a hydraulic drive for applying a torque to rotate the sprocket at a substantially constant speed and thereby drive the pintle chain at a substantially constant speed, wherein the torque remains free of surges throughout a full sprocket rotation.

14. The drive-train of claim 11, wherein at least three teeth simultaneously engage the drive surfaces of a corresponding number of open-barrel rollers of the pintle chain at locations where the engaged teeth join the body.

15. The drive-train of claim 11, wherein the chain has a chain pitch of about 2.609 inches, and wherein the sprocket comprises a drive-sprocket having a root diameter of greater than five inches.

16. The drive-train of claim 11, wherein the open-barrel rollers comprise an outer diameter of at least three-quarters of an inch.

17. The drive-train of claim 11, wherein the sprocket comprises seven teeth and a body having a root diameter of greater than five inches.

18. The drive-train of claim 11, wherein at least four teeth simultaneously engage the drive surfaces of a corresponding number of open-barrel rollers of the pintle chain at locations where the engaged teeth join the body.

19. A method of driving an open barrel pintle chain having a plurality of longitudinally-spaced pinned connections, each pinned connection defining a pivot axis and comprising at least one open-barrel roller having a constant outer radius of curvature and a characteristic outer-diameter extending around only a portion of the corresponding pivot axis, the method comprising:

rotating a drive-train sprocket having a body bounded by a root circumference and a plurality of teeth numbering from six to twelve extending from the body, the plurality of teeth being circumferentially-spaced about the body and each tooth defining a chain-engaging portion for engaging a corresponding portion of the pintle chain; and simultaneously engaging the at least one open barrel roller of a first pinned connection with a first tooth at a location where the first tooth joins the sprocket body and the at least one open barrel roller of a second pinned connection with a second tooth at a location where the second tooth joins the sprocket body, wherein the second pinned connection is longitudinally-spaced from the first pinned connection, and wherein the outer radius of curvature of the open-barrel rollers is greater than the respective distances from the pivot axes of the first and second pinned connections to the root circumference of the sprocket.

20. The method of claim 19, wherein the sprocket defines a pitch circle, wherein the method further comprises:

locating each respective pivot axis of the first and second pinned connections on the pitch circle.

21. The method of claim 19, further comprising simultaneously engaging the at least one open barrel roller of a third pinned connection with a third tooth, wherein the third pinned connection is longitudinally-spaced from the first and second pinned connections.

* * * * *